(12) United States Patent
Nerden

(10) Patent No.: US 7,920,314 B2
(45) Date of Patent: Apr. 5, 2011

(54) VARIABLE OPACITY OR TRANSLUCENCY OF A THROUGH-VISION PANEL

(76) Inventor: John D. Nerden, Essex (GB)

(*) Notice: Subject to any disclaimer, the term of this patent is extended or adjusted under 35 U.S.C. 154(b) by 431 days.

(21) Appl. No.: 11/998,867

(22) Filed: Nov. 30, 2007

(65) Prior Publication Data

US 2008/0144159 A1 Jun. 19, 2008

Related U.S. Application Data

(60) Provisional application No. 60/872,006, filed on Nov. 30, 2006.

(51) Int. Cl.
*G02B 26/02* (2006.01)
(52) U.S. Cl. ......................................................... 359/227
(58) Field of Classification Search .................. 359/227, 359/232, 233
See application file for complete search history.

(56) References Cited

U.S. PATENT DOCUMENTS

| 1,816,112 | A | * | 7/1931 | Deisch ........................... 374/162 |
| 2,324,038 | A | | 7/1943 | Steele |
| 2,464,954 | A | | 3/1949 | Werth |
| 3,665,915 | A | * | 5/1972 | Katona et al. ................. 359/894 |
| 3,741,631 | A | | 6/1973 | Laing et al. |
| 3,814,506 | A | | 6/1974 | Steele et al. |
| 5,033,829 | A | * | 7/1991 | Faroughy ...................... 359/489 |

FOREIGN PATENT DOCUMENTS

| CA | 974126 | 9/1975 |
| GB | 3018601 | 12/2004 |
| JP | 3172445 | 7/1991 |
| JP | 9249027 | 9/1997 |
| JP | 2002051863 | 2/2002 |
| JP | 2004068347 | 3/2004 |

* cited by examiner

*Primary Examiner* — Euncha P Cherry
(74) *Attorney, Agent, or Firm* — Lerner, David, Littenberg, Krumholz & Mentlik, LLP

(57) ABSTRACT

A multi-sheet through-vision panel includes a first outer sheet, a second outer sheet, and a middle sheet located between the first and second outer sheets. The first and second outer sheets are superposed with one another. At least one light impairing zone is disposed on at least one of the first and second sheets, as well as the middle sheet. A sliding mechanism slides the middle sheet with respect to the first and second outer sheets so that the light impairing zones are moved between a first and second position. The light impairing zones are superposed with one another when the middle sheet is in the first position, but are in a staggered arrangement when the middle sheet is in the second position.

27 Claims, 13 Drawing Sheets

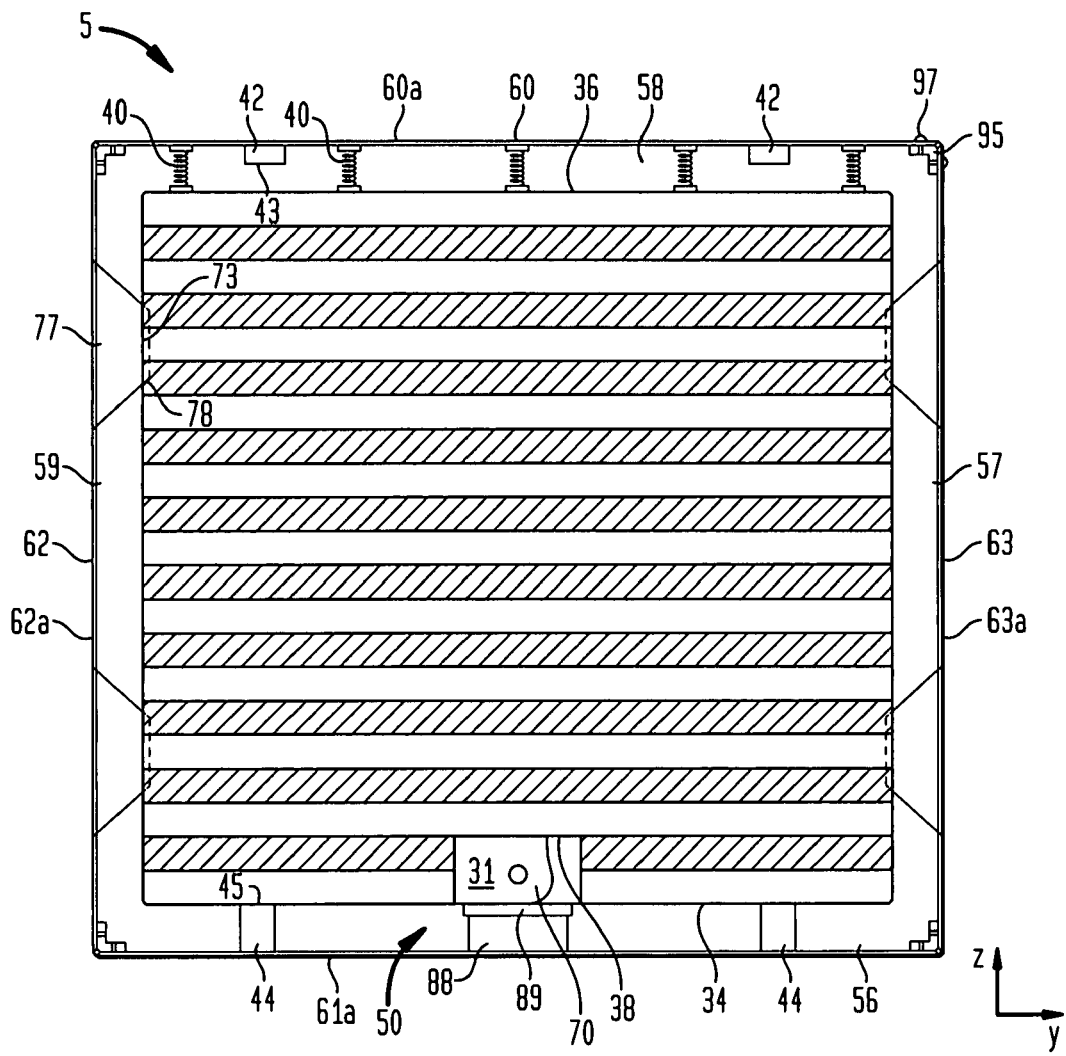

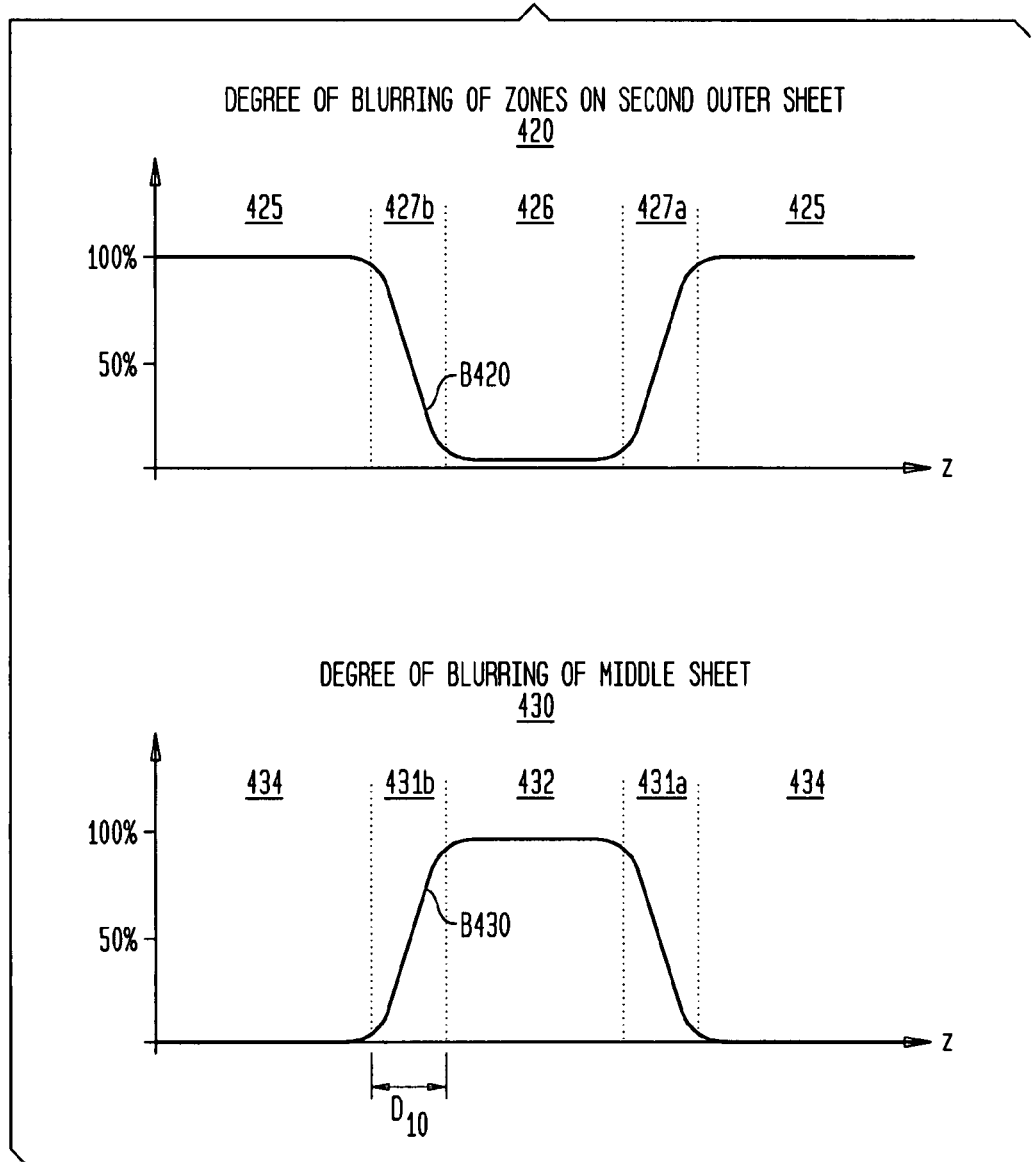

VARIABLE OPACITY OR TRANSLUCENCY OF A THROUGH-VISION PANEL

CROSS-REFERENCE TO RELATED APPLICATIONS

This application claims the benefit of the filing date of U.S. Provisional Patent Application No. 60/872,006 filed Nov. 30, 2006, the disclosure of which is hereby incorporated herein by reference.

FIELD OF THE INVENTION

The present invention relates to through-vision panels having at least one of variable opacity or translucency.

BACKGROUND OF THE INVENTION

Previous through-vision panels (as such panels will be referred to hereinafter for convenience) have been proposed which generally comprise a pair of glass sheets arranged in a spaced apart parallel relationship with a third sheet movable parallel thereto in the space therebetween, such movement being under the control of a moving mechanism operable by an operator. The outer sheets can be equipped with mutually overlying opaque strips so as to provide through-vision between the said strips and the third sheet having similar strips but, being movable under the control of a moving mechanism, may adopt a position in which its opaque strips lie in correspondence with the outer sheet opaque strips, or a position in which its opaque strips lie between the outer sheet opaque strips, or any position therebetween. As will be evident such movement of the inner sheet controls the degree to which there is through-vision or cut-off by the panel as a whole.

Various disadvantages have been found to exist with such previously proposed panels. For instance, arrangement of the opaque strips that are not on the sheets can be improved for through-vision capability and variation of the degree of transparency or blurring. In addition, the design of the mechanical elements for moving the middle sheet can be improved, configured to be used for different types of panels with different sizes and shapes and for different application purposes.

Thus, there are substantial needs for improved through-vision panels as a function of different application types, shapes, transparency or blurring capabilities.

SUMMARY OF THE INVENTION

In an aspect of the present invention, a multi-sheet through-vision panel includes a first outer sheet having a first inner surface, a second outer sheet having a second inner surface, a middle sheet located between the first and second outer sheets, and a sliding mechanism configured to slide the middle sheet with respect to the first and second outer sheets. The first and second outer sheets are superposed with one another. Additionally, the middle sheet has a first outer surface that faces the first inner surface of the first outer sheet and a second outer surface that faces the second inner surface of the second outer sheet. The middle sheet may also alternatively have a recess cut out from the sheet that is configured to accommodate the sliding mechanism. At least one of the first and second inner surfaces has at least one light impairing zone, and the middle sheet has at least one light impairing zone on at least one of said first and second outer surfaces. The sliding mechanism is operable to move the at least one light impairing zone between first and second positions. The light impairing zones are superposed with one another when the middle sheet is in the first position and the light impairing zones are in a staggered arrangement when the middle sheet is in the second position.

In another embodiment in accordance with this aspect of the present invention, the light impairing zones are arranged on both the first and second surfaces of the middle sheet and are substantially facing each other, and the light impairing zones are arranged on both the first and second inner surface of the first and second outer sheet and are substantially facing each other.

In still another embodiment in accordance with this aspect of the present invention, the width of the light impairing zones of the first surface of the middle sheet in a direction of the movement of the middle sheet may be at least the same width or larger than a width of the transparent areas located between the light impairing zones of the first inner surface of the first outer sheet. Alternatively, a width of the light impairing zones of the second surface of the middle sheet in a direction of the movement of the middle sheet may be at least the same width or larger than a width of transparent areas located between the light impairing zones of the second inner surface of the second outer sheet. In still another alternative embodiment, some of the light impairing zones of the first and second outer sheets and the middle sheet are thinner in width in a direction of the movement of the middle sheet towards outer boundaries of the sheets.

In yet another alternative embodiment in accordance with this aspect of the present invention, the sliding mechanism of the multi-sheet through-vision panel includes a bolt arranged perpendicularly to the first outer sheet traversing the first outer sheet. The bolt is configured to be turned with a key to slide the middle sheet. There may also be a translation mechanism fastened to the bolt and a sliding ring encircling a portion of the bolt that projects from the first outer sheet. The sliding ring is configured to rotate freely around the bolt.

In a further alternative embodiment in accordance with this aspect of the present invention, the multi-sheet through-vision panel may include a round frame having an u-shaped cross-section, wherein the first and second outer sheet have a round shape and form a window together with the round frame that is arranged around the outer boundaries of the first and second outer sheets. The middle sheet may be sandwiched between the first and second outer sheets having a substantially round shape with three linearly cut boundaries. Two of the linearly cut boundaries may form linear side edges in a direction to a sliding movement of the middle sheet, one of the linearly cut boundary, being perpendicular to the two linearly cut boundaries and configured to form an area to accommodate the sliding mechanism in the window.

In accordance with another embodiment in accordance with this aspect of the present invention, the multi-sheet through-vision panel having a round frame may also include first and second rails having L-shaped cross-section, the L-shaped first and second rails being interposable with each other so as to form the frame with the u-shaped cross-section.

In another embodiment in accordance with this aspect of the present invention, the at least one light impairing zone on the first or second outer sheets has layers with a first light polarizing direction and the middle sheet has at least one light impairing zone with a second light polarizing direction. Alternatively, the light impairing zone may be an opaque zone, a blurring zone, or a transition from an opaque zone to a blurring zone.

In another aspect of the present invention, a multi-sheet through-vision panel includes a plurality of sheets superposed relative to each other and a plurality of light altering elements provided on at least two of the sheets. At least one of the sheets has the elements movable relative to another of the sheets having the elements between a first position, wherein the elements are superposed relative to each other, and a second position, wherein the elements are interdigitated relative to each other.

In an alternative embodiments in accordance with this aspect of the present invention, the plurality of sheets include first and second outer sheets and an inner sheet located between said first and second outer sheets. Additionally, the sheets containing the plurality of light altering elements include the inner sheet and one of the first and second outer sheets.

In still another alternative embodiment in accordance with this aspect of the present invention, the multi-sheet through-vision panel further includes a means for moving the inner sheet relative to the first and second outer sheets.

In another embodiment in accordance with this aspect of the present invention, the light altering elements may be comprised of a transparent material that has a transparency ranging from 0% to 100% transparent. Alternatively, in an alternative embodiment, light is diffused when passing through said light altering elements. In still another alternative arrangement, the light altering elements substantially prevent light from passing through the portions of the sheets containing the altering elements.

In another embodiment in accordance with this aspect of the present invention, the plurality of sheets are substantially round. Alternatively, the plurality of sheets may be substantially rectangular.

In still another embodiment in accordance with this aspect of the present invention, transparent elements are located between the light altering elements of the first or second outer sheet, and the width of the light altering elements of the middle sheet in a direction of the movement of the middle sheet is at least the same width or larger than a width of the transparent areas.

In yet another embodiment in accordance with this aspect of the present invention, at least some of the light altering elements of one of the first and second outer sheets and the middle sheet are thinner in width in a direction of the movement of the middle sheet towards outer boundaries of the sheets.

In another aspect of the present invention, a multi-sheet through-vision panel includes a plurality of sheets superposed relative to each other and a plurality of light altering elements provided on at least two of the sheets. At least one of the sheets having the light altering elements is movable relative to another of the sheets having the light altering elements between a first position whereby the elements are superposed relative to each other and a second position whereby the light impairing elements are interdigitated relative to each other. Additionally, transparent elements are located between the light altering elements. A width of the light altering elements in a direction of movement of the sheets relative to one another is the same width or larger than a width of the transparent elements.

These and other features and characteristics of the present invention will be apparent from the following detailed description of preferred embodiments which should be read in light of the accompanying drawings in which corresponding reference numbers refer to corresponding parts throughout the several views.

BRIEF DESCRIPTION OF THE DRAWINGS

FIG. 2b is a sectional view along line CL1 of FIG. 1a of the first embodiment of the present invention;

FIG. 8b shows a graph showing degree of blurring of a section of the panel shown in FIG. 8a;

It should be noted that the dimensions of the assemblies shown in the Figures may be distorted for clarity of the illustration, and different proportions of the different dimensions are also possible, and like numbers represent similar elements.

DETAILED DESCRIPTION

Figure 1A:
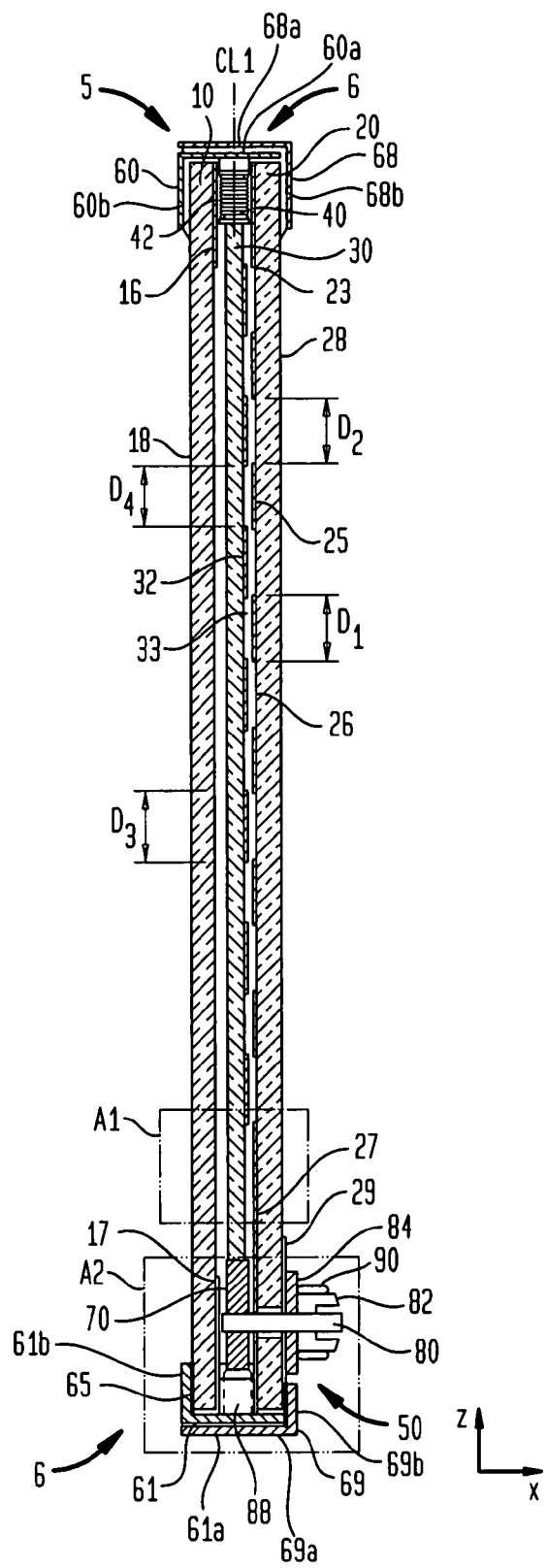
FIGS. 1a-b are sectional views according to a first embodiment of the present invention.
Figure 1B:
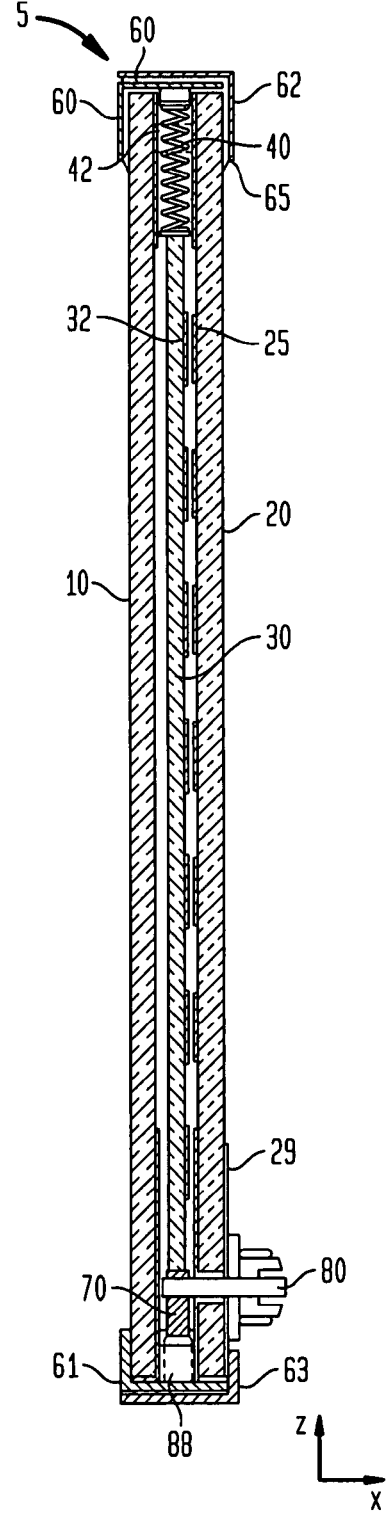

A through-vision panel 5 in accordance with a first embodiment of the present invention is illustrated in FIGS. 1a and 1b. FIG. 1a shows a cross-sectional view of a panel in the closed position, having reduced or no through-vision capability, while FIG. 1b shows the same panel in an open position, with increased through-vision capability. The panel 5 includes a frame 6 with the first and second outer sheets fixed to the frame 6. As used in this disclosure, terms such as "upwardly," "upper," "top," "downwardly," "lower," "bottom," "vertically," and "horizontally" should be understood as referring to the frame of reference of the element specified and need not conform to the normal gravitation frame of reference. In FIGS. 1a and b, the upward direction is the direction towards the top of the drawing. The terms "inside" and "outside" refers to surfaces that are either facing the inside of panel 5 or the outside, respectively.

In the variant shown, frame 6 encloses the outer edges of the first and second outer sheets 10, 20 around the entire circumference, and also covers the outer boundary areas of the outer surfaces 18, 28 of the first and second outer sheets 10, 20 by forming a U-shaped cross-section. As can be seen in the cross-sectional view of FIGS. 1a and 1b, the U-shaped cross-section of the frame 6 is made of a first and second rectangular frame with an L-shaped cross section, the first and second L-shaped frame made of rails 60-63 and 66-69, respectively. The L-shaped rails 60-63 forming the first rectangular frame include first ledges 60a-63a that extend in X-direction, and second ledges 60b-63b extending in a plane formed by the Y and Z axes. The first outer sheet 20 is framed on each side by upper and lower rails 60, 61, and by the side rails 62, 63 (shown in FIG. 2b). The second ledges 60b-63b of the four rails 60-63 are covering an edge portion of the front surface 18 of the first outer sheet 10, and terminate with a beveled end and are connected together by corner components 95 so as to form a first rectangular frame having an L-shaped cross-section.

A second rectangular frame is made of upper and lower rails 68, 69 and side rails 66, 67. The second ledges 66b-69b of the second rectangular frame extending in the plane formed by the Z and Y axes cover the outer boundary portions of the outer surface 28 of the second outer sheet 20. The first ledges 66a-69a extend in X-direction and are substantially covering the outer surfaces of the first ledges 60a-63a of the first rectangular frame. In the variant shown, an insulation material such as filler material 65 such as a silicon sheet, encapsulant or epoxy glue is interposed between the second ledges 62b, 63b, 66b, 67b and the upper surfaces of the first and second outer sheets 10, 20. Alternatively, any type of tape with sound insulating capabilities can be used. The ends of second ledges 66b-69b (shown in FIG. 2b) of the four rails 66-69, are also beveled so as to fit into each other to form the second rectangular frame. The inner dimensions in Y and Z direction of the second rectangular frame are slightly bigger than the outer dimensions of the first rectangular frame, so that the second rectangular frame will embrace the first rectangular frame with defined tolerances. The second rectangular frame can be attached to the first frame by rivets or screws, or can also be attached by a filler material 65 that is filled therebetween.

The first and second rectangular frames engaged with each other form together with the first and second outer sheets 10, 20 a rectangular panel 5, including the middle sheet therein. The rails 60-63 and 66-69 are preferably made of a high-resistant metal material, such as hardened steel, mild steel that is pressed and folded into an L-shape, or any metal or durable plastic material. While the first outer sheet 10 is connected with second ledges 60b-63b, and the second outer sheet 20 is attached to second ledges 66b-69b, the first and second outer sheets 10, 20 are substantially parallel to each other and form an inner space to accommodate middle sheet 30.

Preferably, the first and second outer sheets 10, 20 and the middle sheet 30 are glass sheets. The first and second outer sheets have a protective function, sheets 10, 20 can be made of a glass material with high resistance depending on the purpose of the through-vision panel 5. Typical glass material used for the first and second outer sheets include Pyroshield GWPP Safety Fire resisting glass, Pyroguard Clear C730, 6 mm Pyran 'S' Clear Fire resisting glass, 10 mm Pyrodur Clear, 15 mm Pyrostop Clear, or 19 mm Pyrosec. The middle sheet 30, having the main function of being linearly slidable to vary the through-vision capabilities of the panel 5, can be made thinner and less resistant than the first and second outer sheets 10, 20. If the first outer sheet 10 has to face a hazardous area, such as law enforcement facilities or psychiatric hospital rooms, where there is a likelihood of occupants using force against the first outer sheet, the first outer sheet can be made very resistant, and substantially thicker than the second outer sheet 20 or the middle sheet 30.

Figure 2A:
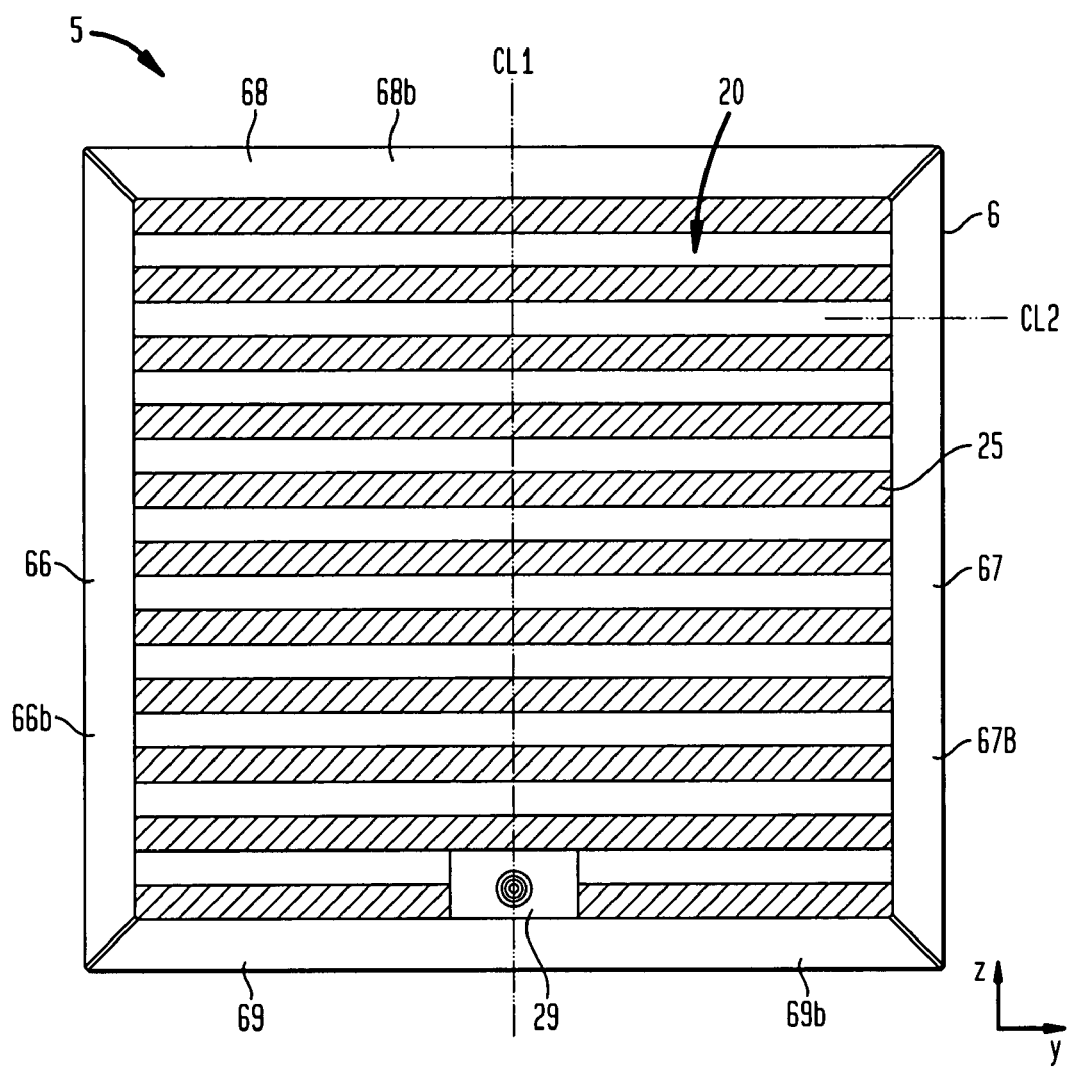
FIG. 2a is a plan frontal view according to the first embodiment of the present invention.

FIG. 2a depicts a front plan view of the panel 5, and FIG. 2b depicts a cross-sectional plan view of the panel 5, seen along the cutting line CL1 shown in FIG. 1a. In the inner space of the frame 6, upper and lower spacer elements 42, 44 are sandwiched between the first and second outer sheets 10, 20, and are arranged on an outer periphery area of the first and second outer sheets 10, 20. In the variant shown, the lower spacer elements 44 are arranged flush with the lower edge of the first and second outer sheets 10, 20, and are also attached to the first ledge 61a of rail 61. The spacer elements 44 can be attached to the first ledge 61a of rail 61 by a screw or bolt penetrating the first ledge 61a, and can also be glued to the sheets 10, 20 by an epoxy resin. The upper spacer elements 42 are attached the same way as the lower spacer elements 44, but are arranged flush with the upper edge of the sheets 10, 20, and attached to the first ledge 60a of the upper rail 60.

The upper and lower spacer elements 42, 44 also define abutment surfaces 43, 45, that can limit the vertical linear movement of the middle sheet 30 between the first and second outer sheets 10, 20. Spacer elements 42, 44 are preferentially made of a plastic material such as nylon or polyamide, but for increased fire-proofness can be made of a ceramic material such as a ceramic fiber paper which can be subjected to high temperatures but maintains its density and tensile strength. Alternatively, composite material can be used including calcium-silicate, ceramic and chloropene. In an open position, the lower edge 34 of the middle sheet 30 can abut against the upper edges 45 of the lower spacer elements 44. In the open position, it is possible to see through panel 5 through the transparent zones 26 and 33 of the outer sheet 20 and the middle sheet 30. In this position, the middle sheet 30 is at a location relative to the second outer sheet 20, where the opaque zones 25 of the outer sheet 20 are arranged in phase with the opaque zones 32 of the middle sheet 30, in other words, opaque zones 25 and 32 are substantially located at the same position in the Z axis. The open position of the panel 5 is shown in FIG. 1b.

In a closed position, as shown in FIG. 1a, the panel 5 is substantially opaque, and the through-vision capabilities of the panel 5 from a viewpoint in either positive or negative X axis is reduced or prevented. In the closed position, the middle sheet 30 can be abutting against the lower edges 43 of the upper spacer elements 42. Opaque zones 25 and 32 alternate each other on the direction of the Z axis. In the variant shown in FIG. 1a, width D3 of the opaque zones 32 of the middle sheet 30 are larger than the transparent zones 26. Accordingly, the spacer elements 42, 44 have a first function of keeping the first and second outer sheets at a predefined distance from each other in X-direction, and have a second function as abutting blocks defining the range of linear translation of the middle sheet 30 together with a sliding mechanism 50.

By linear movement of the opaque zones 32 of the middle sheet 30 relative the second outer sheet 20, the opaque zones 32 and 25 provide a shuttering effect. The linear movement of the middle sheet 30 relative to the first and second outer sheets 10, 20 is guided by guide blocks 77 with the gliding surfaces 73. In the variant shown, four guiding blocks are arranged close to the corners of the first rectangular frame and are attached to the first ledges 62a and 63a of side rails 62, 63. Opposing gliding surfaces 73 of the blocks 77 arranged facing each other on the ledges 62a and 63a define a distance in Y-direction that is slightly bigger than the width of middle sheet 30 so as to allow the middle sheet to be movable vertically. The gliding blocks 77 can be made of the same material as spacers 42, 44, but can also be made of plastic which has an increased low-frictional characteristic, for example polytetrafluoroethylene (PTFE), polyimide, or polyethylene or the like. In a variant, the guiding blocks can be made of a metal material with a sliding surface 73 being coated with a low-friction plastic material, such as PTFE. The gliding blocks can also have the same thickness in X-direction as the spacers 42, 44 and thereby can also provide support for the first and second outer sheets 10, 20.

Figure 3A:
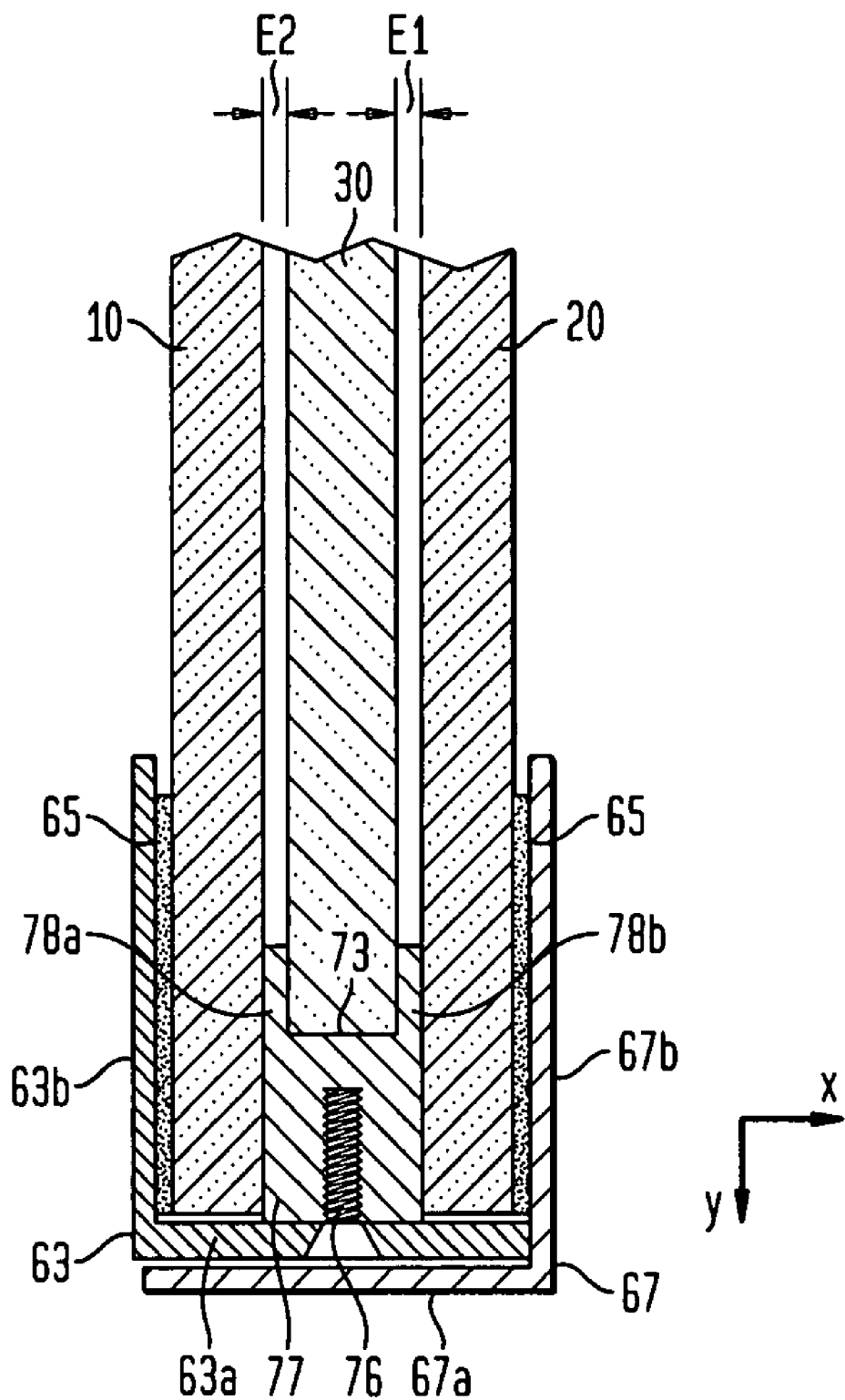
FIG. 3a is a fragmentary cross-sectional view along line CL2 of FIG. 2a of the first embodiment of the present invention.

The guiding blocks 77 are shown in FIG. 3a in a fragmentary cross-sectional view along the line CL2 of FIG. 2a. The guiding blocks have a recessed area accommodating the middle sheet 230 forming the gliding surfaces 73, and have two protruding lateral guide elements 78a and 78b that protrude into the gaps between the first outer sheet 10 and the middle sheet 30, and the second outer sheet 20 and the middle sheet 30. The guiding block shown is attached to the first ledge 63a of the rail 63 by a screw 76. The middle sheet 30 is configured to slide in vertically against the gliding surface 73, and the inner side walls of the lateral guide elements 78a and 78b. The thickness in X-direction will define the thickness E1 and E2 of the gaps between the first and second outer sheet 10, 20, and the middle sheet 30. The lateral guide elements therefore keep the middle sheet in a defined position on the X-axis, in parallel to the first and second outer sheets 10, 20. Preferable ranges of gaps L1 and L2 are between 1 mm and 10 mm, more preferably between 2 mm and 5 mm. In a variant, the guiding blocks are integral parts of the first and second rectangular frames, in FIG. 3a being depicted as rails 63 and 67, or are made by an additional bar, made of the same material as rails 63 and 67, that protrudes into the space between sheets 10 and 20, the additional bar being connected to either of the rails 63 and 67.

The linear movement of the middle sheet 30 relative to the panel 5 with the first and second outer sheets 10, 20 is performed by a sliding mechanism 50 that is preferably arranged in a lower portion 56 of the panel 5. In the variant shown, the middle sheet 30 has a recessed area 31 accommodating the sliding mechanism 50, to maximize the useable window surface are of the through-vision panel. The upper edge 36 of the middle sheet 30 is abutting against springs 40. In the variant shown, five spiral springs are attached along the first ledge 60a of the upper rail 60, and are configured to press downwardly against the upper edge 36 of the middle sheet 30. The sliding mechanism is shown in FIGS. 1a, 1b, and 2b, includes a cam 70 that is rotated by a means of a bolt 80. The rotation of the bolt 80 by a user actions cam 70 to displace the middle sheet 30 linearly in Z-direction. The cam 70 has a substantial rectangular shape, with two opposite corners being rounded with different radii R1 and R2 (FIG. 3d). The rounded corner with the radius R2 slides along the lower edge 38 of the recessed area 31 of the middle sheet 30 when the cam 70 is turned by bolt 80 in clock-wise direction. This action switches the panel 5 from open position (FIG. 1b) to closed position (FIG. 1a). During the transition from open to closed position, the rounded corner with the radius R1 will slide on the abutting surface 89 of a socket 88. The rounded corner with radius R1 has a center being the rotational axis of the bolt 80, so that in any position of the cam 70 between the open and closed position of the middle sheet 30, the distance between the rotational axis of the bolt 80 and the abutting surface 89 of the socket 80 is constant, being the length of radius R1.

To switch from the open to closed position, cam 70 is turned clockwise by 90°, so that abutting surface 72 of cam 70 will disengage from the lower edge 38 of the recessed area 31 of the middle sheet 30, and abutting surface 74 will engage with the lower edge 38 of the recessed area 31. Width D72 between abutting surface 72 and the rotational axis of bolt 80 is smaller than width D74 between the abutting surface 74 and the rotational axis of bolt 80, so that the middle sheet is displaced by a distance being the difference D74 minus D72. Accordingly, the distance between opposing spacers 42 and 44 and their respective abutting surfaces 43, 45 is at least the difference D74 minus D72. To bring the middle sheet 30 back into open position, the bolt 80 is turned counter-clockwise by 90°.

For the variable through-vision capability of the panel 5, at least one of the first or second outer sheets 10, and the movable middle sheet 30 has complementary alternating patterns of a light impairing zones or light altering elements, such as opaque, and transparent zones. In the variant shown in FIG. 1a, opaque zones 32 alternate with transparent zones 33 on the middle sheet, while opaque zones alternate with transparent zones 26 on the outer second outer sheet 20, along the Z-axis. The width of the opaque zone 25, being D1, is wider or the same width than the corresponding transparent zone 33 having the width D4. The same rationale is valid for opaque zone 32 being wider than transparent zone 26 (D3>D2). As explained above, the patterns are configured to cover each other viewed from the X-direction when the middle sheet 30 is in the closed position. The opaque zones are applied on the opposing surfaces of the middle sheet 30 and the outer sheet. In the variant shown, the first outer sheet 10 can optionally include outer frame cover zones 16, 17, applied on the inner surface of the first outer sheet 10, for example for esthetical purposes, covering mechanical parts or protecting parts from aging by sunlight or other radiation. The second outer sheet 20 also has upper and lower cover zones 23 and 27. The cover zones 16, 17, 23 and 27 can be also frames that surround the outer areas of the sheets 10, 20.

Figure 3B:
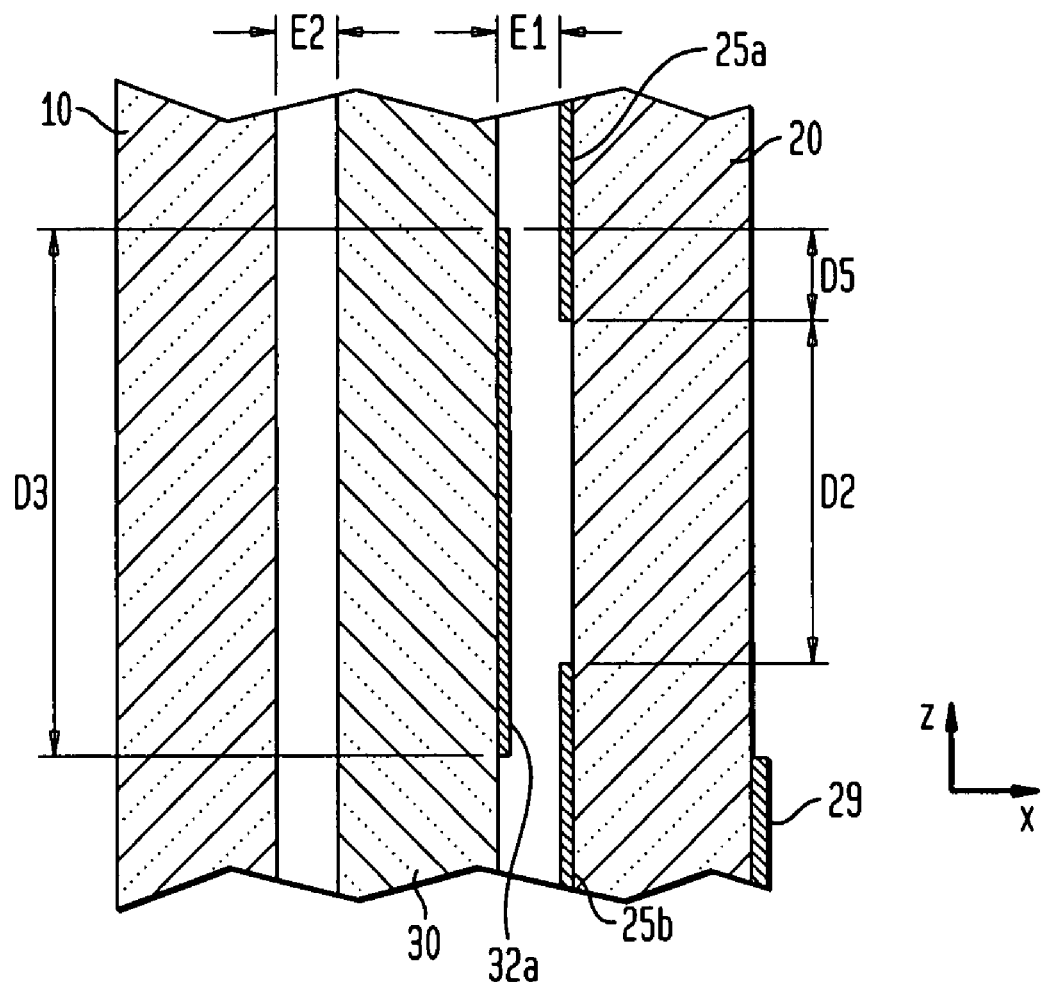
FIG. 3b is a fragmentary cross-sectional view of area A1 shown in FIG. 1a of the first embodiment of the present invention.

FIG. 3b shows a fragmentary view of the section A1 of FIG. 1a, the middle sheet 30 being in the closed position. Adjacent opaque zones 25a, 25b applied on the inner surface of the outer sheet 20 are overlapping the opaque zone 32a of the middle sheet 30, since D3 is wider than D2. The minimal overlap length D5, being the overlap length in the closed position, is desirably longer than the distance or gap E1 between the inner surfaces of the middle sheet 30 and the second outer sheet 20, for example, D5 can be substantially 2 times D5. For example, if the gap L1 between two sheets 20, 30 is 2 mm, the overlapping zone D5 is 4 mm. In the variant shown, the opaque zones 25a, 25b, and 32a are strips that are arranged parallel to each other in Y-direction (FIG. 2b) and are attached to the surface of the sheets 20, 30 facing each other. Typically, 3M ScotchShield™ Ultra Safety and Security Window Film can be used and adhered to the sheets 20, 30, or a Laserguard Film. A cover 29 is also located on the front surface of the second outer sheet 20 to expand over the area where the sliding mechanism 50 is located. The cover 29 can be made of a plastic protecting the second outer sheet from a user scratching or breaking the sheet 20 at the area of the sliding mechanism 50.

Figure 3C:
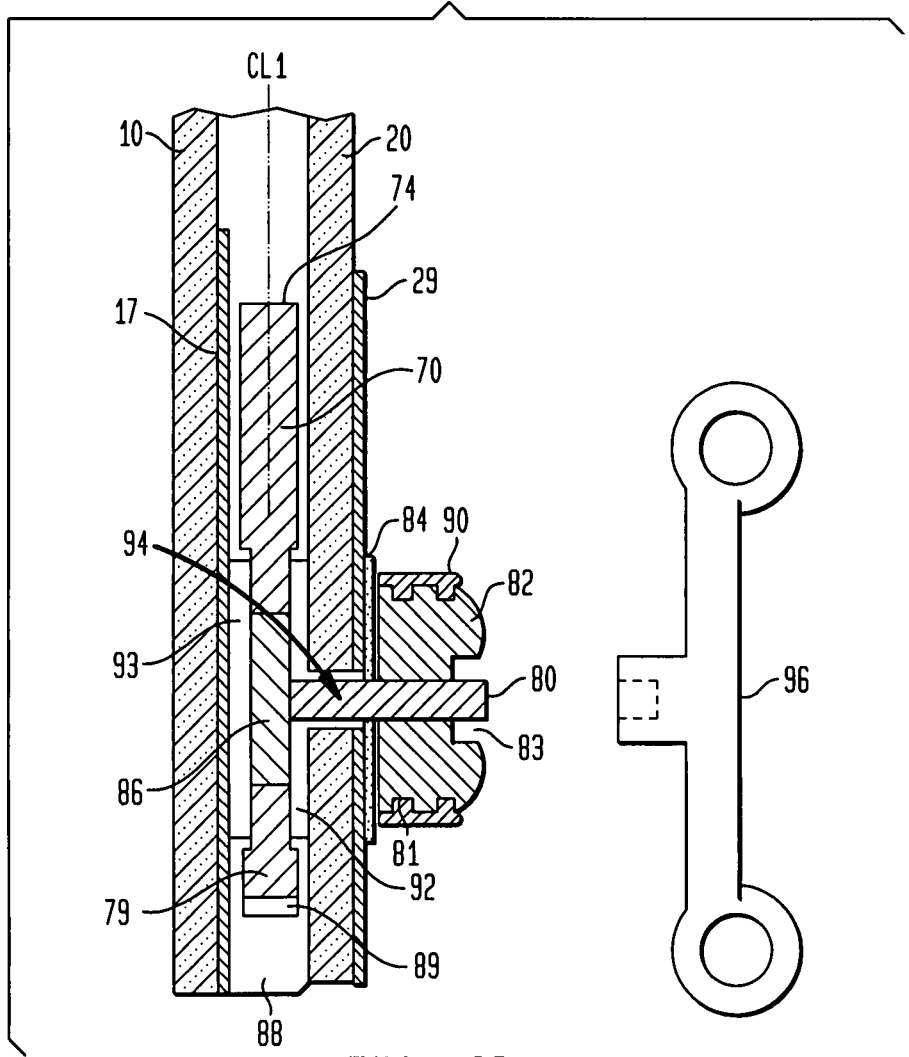
FIG. 3c is a fragmentary cross-sectional view of area A2 shown in FIG. 1a of the first embodiment of the present invention.
Figure 3D:
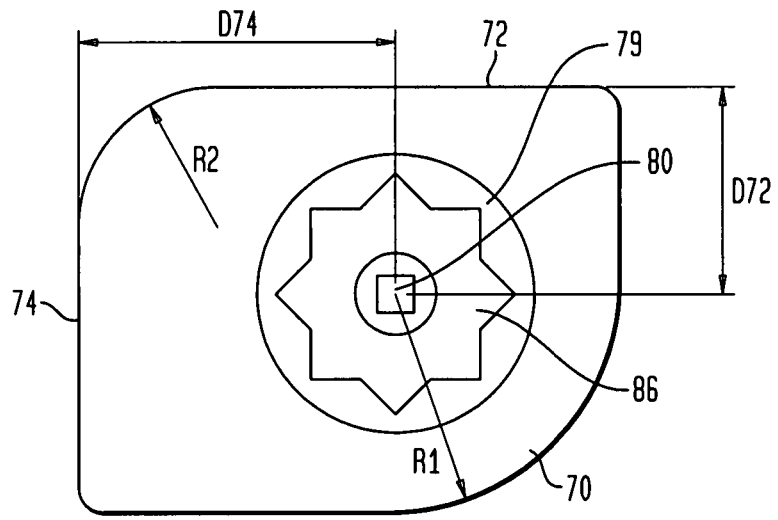
FIG. 3d shows a detailed view of an element of the sliding mechanism shown in FIG. 2b of the first embodiment of the present invention.

FIG. 3c depicts a fragmentary view of the section A2 of FIG. 1A, showing a more detailed cross-sectional view of the sliding mechanism. In the variant shown, the engagement lever 96 is a separate tool that can be engaged onto bolt 80 to turn bolt 80 in clock-wise and counter-clockwise direction to switch between open and close position of middle sheet 30. In a variant, engagement lever 96 can be an integral part of the sliding mechanism 50. The cross-sectional shape of the bolt is a square (FIG. 3d) but other polygon shapes are also possible. The engagement portion of the lever 96 has an opening complementary to the shape of the front portion of the bolt, and can engage into the engagement recess 83 surrounding the bolt 80. A locking ring 82 is arranged around the bolt 80 forming the engagement recess. Locking ring 82 includes attachment grooves 81 configured to hold a slip ring 90 that can freely rotate around the X-axis along the grooves 81. Slip ring 90 encircles substantially the side walls of the locking ring 82. Therefore, the slip ring 90 makes it difficult to grasp or apply forces to the bolt 80 other the use of the engagement lever 96. The bolt 80, locking ring 82, slip ring 90, and engagement disk 86 are preferably made of metal, for example a highly resistant non-corrosive and hardened steel, stainless steel or brass, but also high quality plastics can be used. A flat washer 84 is arranged between the locking ring 82 and the panel 29 having low-frictional upper surfaces, for easy rotation of the bolt 80 and the locking ring 82. Bolt 80 traverses the second outer sheet 20 through a bore 94. A flange-like washer 92 with a T-shape allows the bolt 80 rotate in the bore 94. Bolt 80 abuts to the engagement disk 86, that engages into the cam 70. The engagement disk 86 has a substantially bigger cross-sectional radius than bolt 80 to engage with cam 70, so that stronger momentum can be applied to cam 70 through bolt 80 without damaging the mechanical coupling between bolt 80 and cam 70. An abutment washer 93 is located between first outer sheet 10 and the engagement disk 86. The inner face of the first outer sheet 10 is covered with an opaque cover 17. The elements of the sliding mechanism such as the abutment or thrust washer 93, flange-like washer 92, flat washer 84, and cam 70 are preferably made of low-frictional and hard plastic material, such as at material chosen from the group of nylon, polytetrafluoroethylene (PTFE) such as Teflon or Tetron, polyimide, or polyethylene. In a variant, the components 93, 92, 84, and 70 can be made of a cheap core material and be coated with a low-friction plastic material, such as PTFE.

Figure 4:
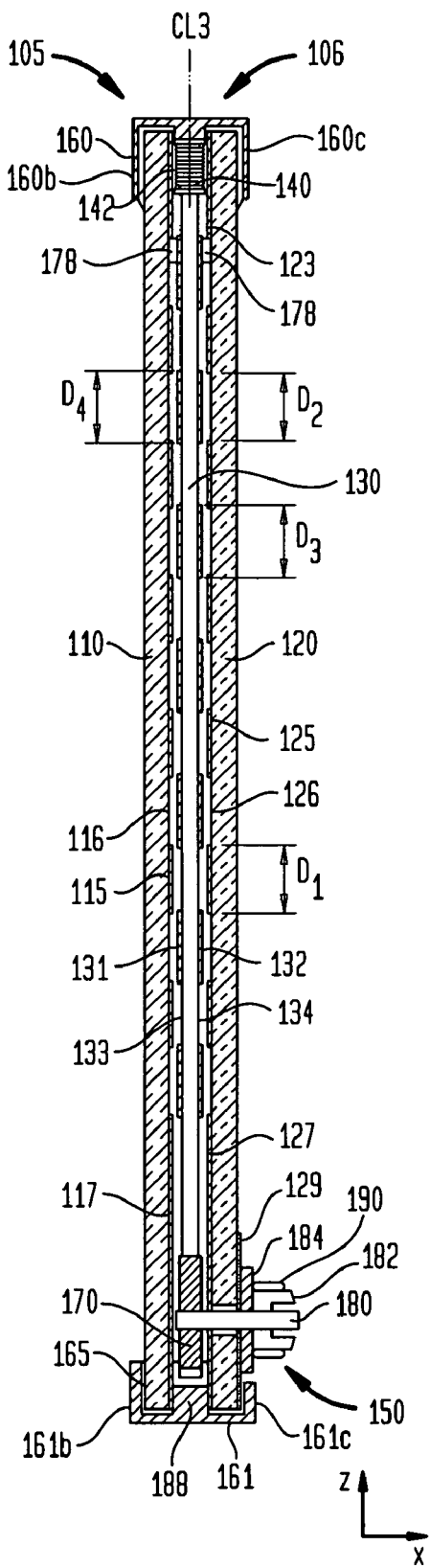
FIG. 4 shows a sectional view according to another embodiment of the present invention.

FIG. 3*d* shows a cross-sectional view of cam 70 along the line CL1 shown in FIG. 1*a* or CL3 shown in FIG. 4. Engagement disk 86 has dents around the circumference for better engagement into cam 70, and to avoid slipping of the engagement disk 86 relative to cam 70, when forces are applied to the bolt 80. Cam 70 has a recessed, round area 79 to fit in the abutment washer 93.

Another embodiment of the present invention is shown with respect to FIG. 4. Panel 105 is made of a frame 106 with middle sheet 130 being in the closed position. Rails 160 and 161 arranged around the outer edges of first and second outer sheets 110, 120 are not made of L-shaped rail elements, but of U-shaped elements that are holding the first and second outer sheets 110, 120 together. The U-shaped elements of frame 106 are preferably attached to each other in the corners of frame 106. Middle sheet 130 is equipped with opaque areas 131, 132 on both surfaces, and the first outer sheet is also equipped with opaque areas 115. The arrangement of the opaque areas 131, 132 on both surfaces of the middle sheet 130 are substantially axi-symmetrical along the Z-axis towards each other, and the opaque areas 115 and the cover 117 for the sliding mechanism 150 of the first outer sheet 130 is substantially axi-symmetrical to the opaque areas 125 and cover 127 of the second outer sheet 120. The provision of opaque areas on both first and second outer sheets 110, 120 and on both sides of the middle sheet 130 provides an increased shielding from rays in the closed position of the panel 105, since a light creepage path from one side of panel 105 to the other side is longer. Slip ring 190 of the sliding mechanism 150 also has slanted upper portions so as to substantially cover side walls and front face of the locking ring 182.

In FIG. 4, guidance assuring parallel movement of the middle sheet 130 toward the first and second outer sheets 110, 120, setting the position of the middle sheet 130 in X-direction can be done by adhesive, low-friction knobs 178 that have a thickness in X-direction that corresponds substantially to the thickness of the gaps E1, E2 (FIG. 3*a*) between the sheets. In such variant, no lateral guide elements such as the ones described with reference to FIG. 3*a* are required. The knobs 178 can be placed on at least one of both first and second outer sheets 110, 120 facing the middle sheet 130, or on the middle sheet 130 facing the first and second outer sheets 110, 120. They are preferably placed in an area of the sheets 110, 120, 130 that is hidden from an outside viewer that is looking at the panel 105 from in direction of the X-axis, for esthetical purposes. In the variant shown, knobs 178 are placed behind covers 113, 123, 117, and 127, of the first and second outer sheet, respectively. Alternatively, knobs 178 can be placed in areas behind the second ledges 160*b*, 160*c*, 161*b*, and 161*c* of frame elements 160, 161, or are placed onto opaque areas 125, 115 of the first and second outer sheets, thereby hidden from an outside viewer. The knobs 178 may be self-adhesive elements that are made of a low-frictional plastic material by using the same material used for the guiding blocks 77, as described above. In a variant, the knobs 178 can also be made of aluminum bars that are coated with a low-friction plastic material.

Figure 5A:
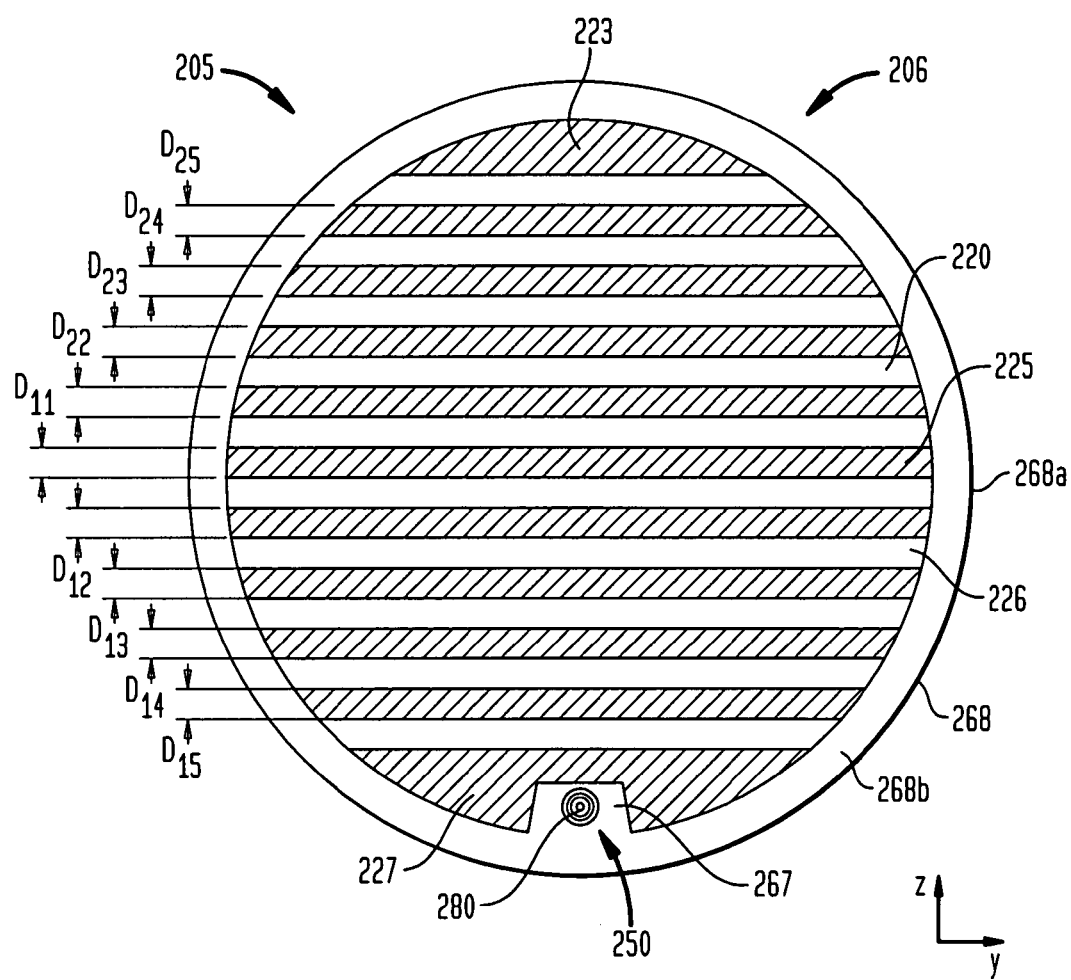
FIG. 5a is a plan frontal view according to another embodiment of the present invention.
Figure 5B:
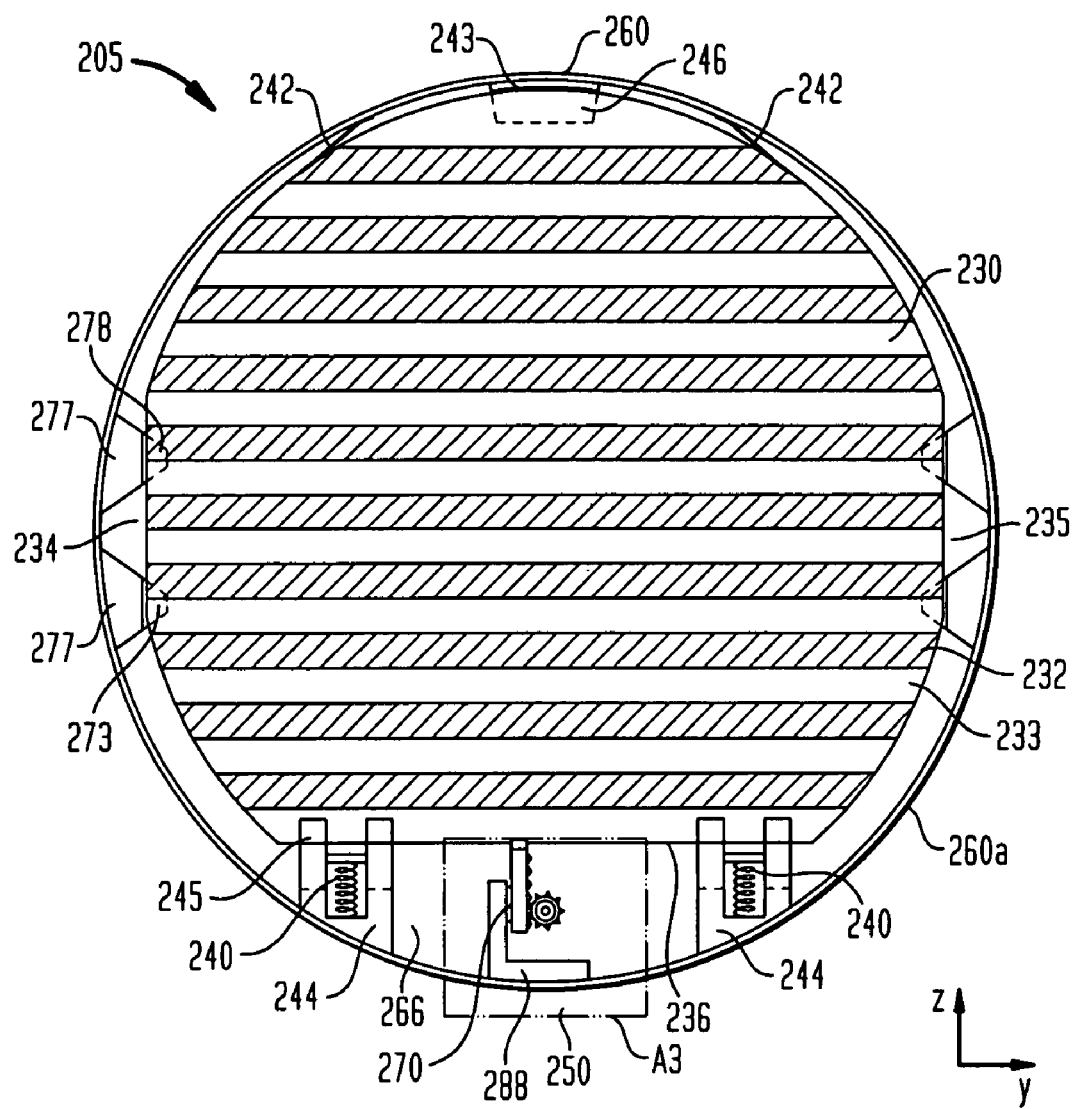
FIG. 5b is a sectional view along line CL1 of FIG. 4a of another embodiment of the present invention.

An additional embodiment shown with reference to FIGS. 5*a* and 5*b* is panel 205. In this embodiment, panel 205 is substantially round or ovally shaped. Frame 206 is preferentially made of two round rails 260, 268 with an L-shaped cross-section that are fit into each other. The ledges extending in X-direction are the first ledges 260*a*, 268*a*, while the first ledge 260*a* is substantially surrounded by the first ledge 268*a*. Second ledge 268*b* form a front face encircling the outer area of the front surface of the second outer sheet 220. Opaque areas are arranged horizontally to each other on the middle sheet 230, and on at least one of the first or second outer sheet 210, 220. In the variant of FIGS. 5*a* and 5*b*, while the transparent areas 226 between the opaque areas 225 are substantially the same width, the width of the opaque areas 225 are decreasing from the opaque areas in the center of the panel 205, towards opaque areas located towards the upper and lower boundaries of the panel 205 in vertical direction. For example, the width of the opaque layers follows the rule D11>D12>D13>D14>D15, and D11>D22>D23>D24>D25. Cover 227 are optically covering the lower area 266 where the sliding mechanism 250 is arranged, and cover is 223 covers the upper portion of the inside of the panel 205 where the leaf springs and the spacer 243 is arranged. Covers 223 and 227 can be preferably arranged on an inner surface of the second outer sheet 220.

Alternatively, it is also possible that the transparent areas 226, 233, between the respective opaque areas 225, 232 have variable width according to the rule defined above, while the opaque areas 225, 232 have a constant width along the Z-axis, or that both transparent areas 226, 233 and opaque areas 225, 232 have an decreasing width, with a decreasing width of the sheets 220, 230 on the X-axis.

In the panel 205, the middle sheet 230 is sandwiched between the first and second outer sheets 210, 220, and has a substantially round shape, but further includes three linearly cut boundaries 234-236. Two of the linearly cut boundaries 234, 235 forming linear side edges in direction to a sliding movement in the Z-axis of the middle sheet 230. The linear boundaries 234 and 235 are formed so as to guide the vertically slidable middle sheet 230 with guiding blocks 277 configured to guide the sheet 230 in a fixed position on the Y-axis. The guiding blocks 277 have protruding lateral guide elements 278 for guiding the middle sheet 230 in a defined position in the X-axis, parallel to the first and second outer sheets 210, 220, as shown with reference to FIG. 3*a*. Since the guiding blocks 277 are located close to each other, additional guidance support for the middle sheet 230 is provided with the upper and lower spacers 243, 244 also having protruding lateral guide elements 246. In another variant, on one side of the middle sheet 230 guiding blocks 277 are arranged, while on the other side springs such as leaf springs push the middle sheet 230 towards the guiding blocks 277, in either positive or negative Y-direction.

The lower linearly cut boundary 236 forms an area 266 for accommodating the sliding mechanism 250. Boundary 236 is perpendicular to the two linearly cut boundaries 234, 235. The rack 270 of sliding mechanism 250 is attached to the lower boundary 236 of the middle sheet 230 to change the position of the middle sheet 230 relative to the first and second outer sheets 210, 220. The upper springs are leaf springs 242 that push downwardly to the upper portion of the middle sheet 230. In the lower portion of the panel 205, coil springs 240 are pushing upwardly on the lower boundary 236. Coils springs 240 are arranged in a slot arranged in the spacers 244, so as to provide guidance of the springs 240 in Y-direction, while allowing free action in the Z-direction. Springs 242, 240 are therefore counterbalancing the middle sheet 230. This is desirable if the middle sheet 230 is very heavy and therefore the forces that a user has to apply on the sliding mechanism 250 are substantially reduced.

The second ledge 268b of rail 268 extends into an area of the sliding mechanism 250, so as to provide protection of second outer sheet 220 at the area where the sliding mechanism is located, forming a protection panel 267. The protection panel 267 also provides rigidity for the bolt 280 that not only traverses second outer sheet 220, but also frame 260 at the protection panel 267. Such protection panel can also be located on both sides of panel 205.

Figure 6:
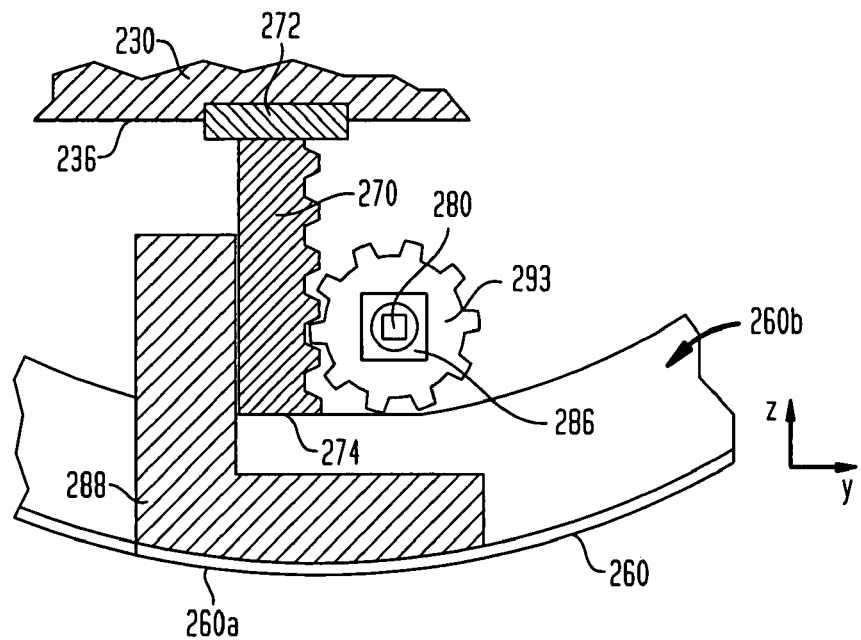
FIG. 6 shows a fragmentary view of area A3 in FIG. 5 of another embodiment of the present invention.

The embodiment of FIG. 5b also includes a variant of the sliding mechanism 250, made of a rack 270 and pinion 293 assembly, a fragmentary view of section A3 shown in FIG. 6. The sliding mechanism 50 shown with respect to FIGS. 2b and 3c are used for a dual positioning of the middle sheet 30 in an open or closed position. However, the sliding mechanism of FIG. 5b allows numerous positions between the open and closed position of the middle sheet 230, so as to allow a user to vary the degree of transparency of the entire panel 205. For this purpose, the teeth of the rack 270 engage with teeth of a pinion 293, the rack 270 slides with the back surface on an L-shaped guiding block 288 that is attached to the first ledge 260a of the rail 260. The upper end of the rack 270 is attached by an attachment device 272 to the lower boundary 236 of the middle sheet 230. This is desirable since the middle sheet 230 is counterbalanced with springs 240, 242, the rack 270 will have to push and pull the middle sheet 230 in both positive and negative Z-axis. Pinion 293 is rotated by means of a bolt 280 having an engagement disk 286 embedded into the pinion, and can be rotated either clockwise or counterclockwise to position the middle sheet in the desired position between the open and closed position. The rack 270 can be designed to abut with a lower surface 274 to a portion of the L-shaped guiding block 288, when the sheet 230 is in a lower position. Other devices that transform a rotary motion into linear motion can be used to displace the middle sheet 230 by a rotary action of a user.

In the variants shown in FIGS. 1b, 3c, and 4, the bolts 80, 180 only traverse the second outer sheet 20, 120, respectively. Alternatively, it is also possible that the bolt 80, 180 traverses only the first outer sheet 10, 110, or both, so that the position of the middle sheet 30, 130 can be varied from both sides of the panel 5, 105 by rotating the bolt 80, 180. In addition, for mechanical stability of the position of the bolt 80, 180, the bolt may traverse both sheets 10 and 20, and a stabilization nut may be arranged on one side of the panel 5, 105 while on the other end of the bolt the engagement recess 83 will be located.

The activation of the sliding mechanism is done by a bolt that is substantially arranged in the middle of the panels 5, 105, 205, on the Y-axis, and in a lower portion of the panels. Alternatively, the location for actuating bolts 80, 180, 280 can also be displaced anywhere in the panel 5, 105, 205 or even outside of the panel, by mechanical operation device. For example by the use of a first bevel gear attached to bolt 80, a second bevel gear meshing with the first bevel gear is attached to a first shaft inside the panel 5. The first shaft can be arranged substantially in the Z-Y plane inside the panel 5. At the end of the first shaft, a third bevel gear is adapted to mesh with a fourth bevel gear, and the fourth bevel gear may be attached to a short shaft that leads outside the panel 5 through the second ledge 69b, that can be rotatable by means of a engagement lever 96 or a crank by a user. The short shaft can, for example, exit the panel at the corners of panel.

Alternatively, the bolt 80 can also be actuated by an electrical motor, in combination with reduction gear equipment. In such embodiment, the position of middle sheet 30 can be varied with a simple electrical switch or trimmer, such as a dual position switch, at a remote location of panel 5.

Figure 7:
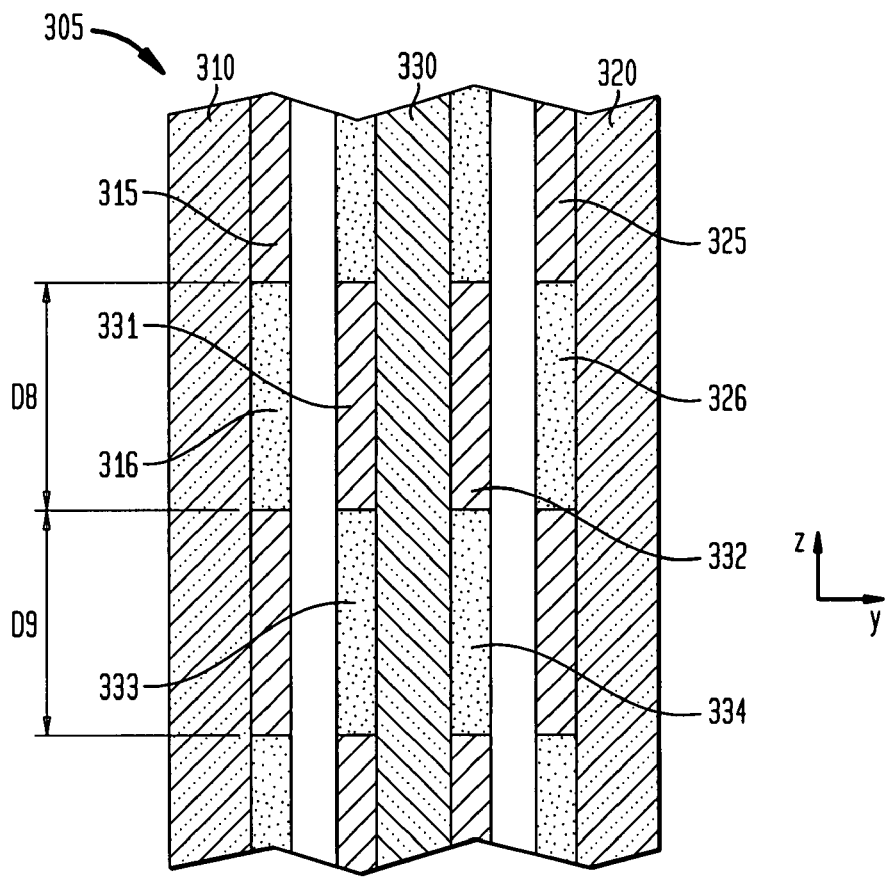
FIG. 7 shows a fragmentary view of a variant of FIG. 3b, according to yet another embodiment of the present invention.

FIG. 7 shows a fragmentary view of a cross-section of first and second outer sheets 310, 320 and the middle sheet 330. Alternating zones 315, 316 of the first outer sheet 310, alternating zones 331, 333 on the first surface facing sheet 310 of the middle sheet 330, alternating zones 332, 334 on the second surface facing sheet 320 of the middle sheet 330, and alternating zones 325, 326 of the second outer sheet 320 are zones with alternating light-polarizing directions. These zones can be made by coating material or depositing layers such as thin film deposition methods in form of strips or other patterns onto glass sheets 310, 320 and 330 that have the alternating polarizing directions. It is possible to laminate films of polarizing layers on the sheets 310, 320 and 330. For example, adjacent zones 315, 316 will have polarization directions that are shifted by 90°, as shown in U.S. Pat. No. 2,617,329, symbolized in FIG. 8 by dotted and dashed material. In such embodiment, the widths of the zones D8, D9 is substantially the same. For example, zones 315, 331, 332, and 325 can have a polarization direction of 0° (being the direction of the Z-axis), while zones 316, 333, 334, and 326 have a light polarizing direction of 90°, being the direction of the Y-axis. In the closed position of middle panel 330, shown in FIG. 8, light passing in the X-direction will be substantially blocked by the panel since the light will have to pass at least two zones with polarizing directions shifted by 90°. Since all the polarizing sheets are arranged inside the panel, they are protected from environment influence such as mechanical wear, scratching, dirt, etc. The middle sheet can also be equipped on one side with alternating polarized zones, for example 332, 334, while the other side is not equipped with such zones.

Figure 8A:
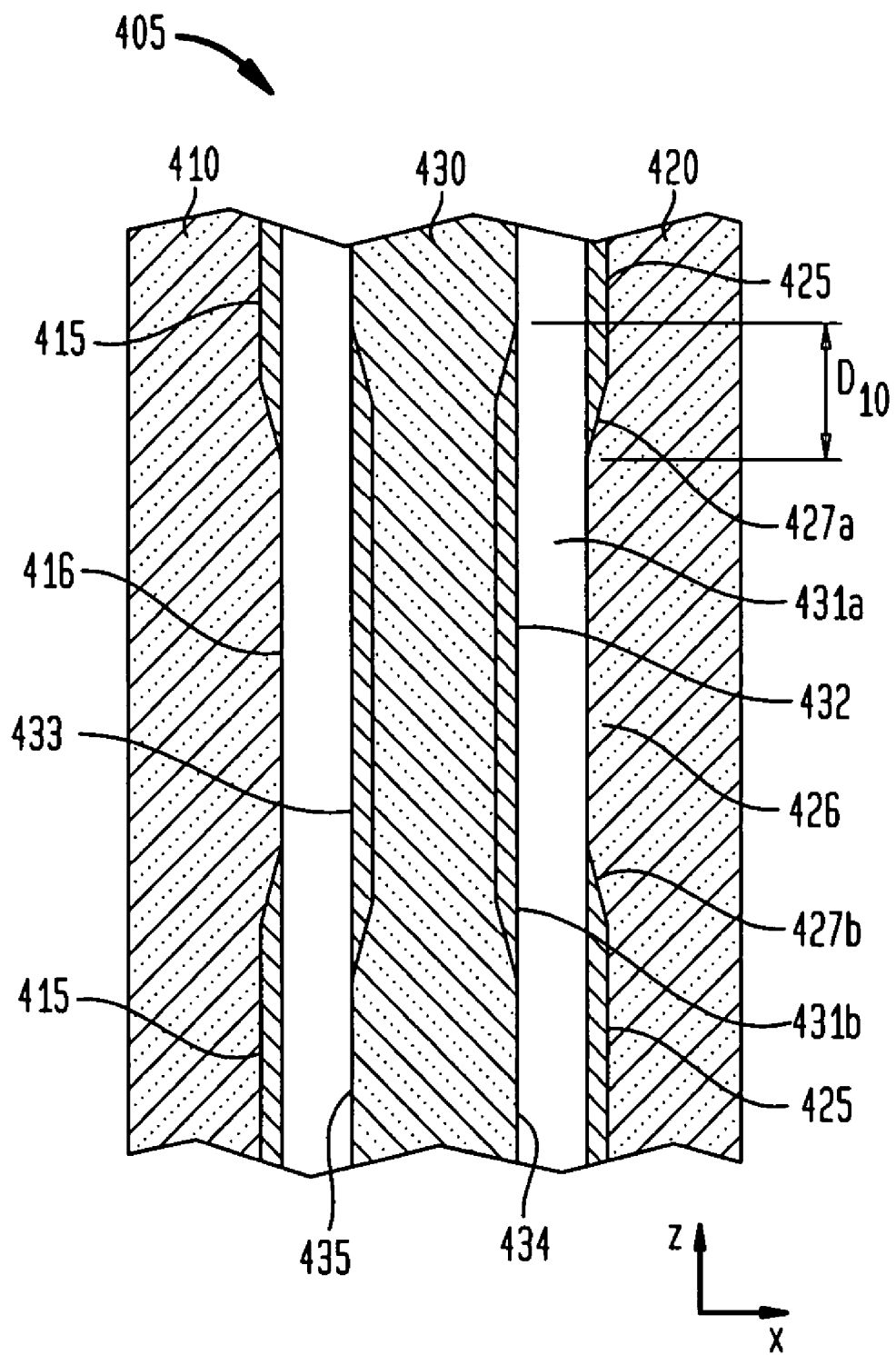
FIG. 8a shows a fragmentary view of another variant of FIG. 3b, according to still another embodiment of the present invention.

In the embodiments shown with reference to FIGS. 1a and 1b, light impairing zones, such as opaque zones 25, 32 are used to substantially prevent light from passing through panel 5, when the middle sheet 30 is in the closed position. However, alternatively, zones 25, 32 are not limited to non-transparent, opaque zones, alternated with transparent zones 26, 33. It is also possible that such light impairing zones are instead translucent or blurring zones that alternate with transparent zones, or a combination of both. Such an alternative embodiment is shown in FIG. 8, depicting a fragmentary view of first and second outer sheets 410, 420, and middle sheet 430 in a cross-sectional view, depicting the middle sheet 430 in a closed position.

Transparency is the property of an optical medium allowing light to pass. Transparent materials can be seen through; that is, they allow clear images to pass. The opposite property is opacity. For example, a sheet of opaque glass that is only 20% transparent, an image on the other side can be clearly seen in all the detailed contours, but the contrast of the image seen would be reduced, since 80% of the light will be filtered out by passing through the glass. Translucent or blurring materials allow light to pass through them only diffusely, that is, the material blurs the image. If a sheet of glass or other transparent material is translucent or blurring, the sheet has the characteristic of transmitting light but causing sufficient diffusion to prevent perception of distinct images through a sheet. For example, a sheet of frosted or blurred glass that is 100% translucent, is able to let light pass through, but no image or only a blurred image can be seen on the other side of the sheet, since the image will be 100% blurred.

Accordingly, zones 425, 432, 435 and 415 impair the ability of light to pass therethrough. Zones 425, 432, 435 and 415 may be zones that are opaque for letting light pass to a certain degree or fully blocking the light, may be blurring to a certain degree, or a combination of both. Zones 416, 435, 434 and 426 are fully transparent, but in a variant these zones could also be made blurring and/or opaque to certain degree. In addition, edge areas of zones may be made transitional, gradually changing from one optical characteristic of one zone to the optical characteristic of the neighbor zone. For example, edge zones 427a and 427b of zone 426 are transitioning from fully blurring to fully transparent and non-blurring. Such transitional zone can also be made for opaque zones changing transparency. The same is applicable for the other zones 415, 433, and 432. In the variant shown, the edge zones 431a, 431b of blurring zone 432 are overlapping with edge zones 427a, 427b of blurring zone 432, and have at least the same width D10. FIG. 8b shows the degree of translucency or blurring along the z-axis of the second outer sheet 420 and the middle sheet 430. By superposing curves B420 and B430, the curves showing middle sheet 430 in a closed position, the panel is blurred along the Z-axis from a viewpoint of the X-axis.

The alternating transparent and blurring or opaque zones are preferentially made by an additive method adding material to sheets 410, 420 or 430, such as placing adhesive stripes like vinyl film onto the sheets, silk screening printing, adding additional glass layers, applying paint on the sheet surfaces, depositing layers by thin-film depositing techniques. In an alternative, other ways of making the zones can be used, for example by surface processing the sheets 410, 420 and 430, with methods such as sand-blasting, etching methods like acid etching, or by using implanting methods, for example by implanting impurities by doping, mixing color particles into glass, or embedding zones into the glass during the manufacturing process, etc. Such alternative embodiments, where the zones are not made using adhesive zones made of plastic strips, are particularly interesting if the panel 405 has to resist high temperatures and needs a high degree of fire proofness. For a fire-proof panel design, all the components can preferably be made of materials that resist higher temperatures than regular ambient temperatures, in particular the plastic elements of the sliding mechanism and the spacers, guiding blocks, and sockets etc. inside the panels.

Another embodiment of the present invention includes radiation proof panels, for example at least one of panels 410, 420 and 430 being radiation-proof glass material such as Med-X™ RWB46 Leaded Glass with a minimum lead content of 2 mm. The relatively high content of lead and barium can provide increased shielding against radiation energies generated by equipment operating in the range of 100 kV-200 kV. In addition, zones 425, 432, 435 and 415 can be made of metal material, for example by applying metal strips on the respective panels 410, 420 and 420 with a high lead content for additional radiation proofness when the middle sheet 430 of the panel 405 is in a closed position. These types of panels are preferably used in hospitals to see into a room with X-ray installations or research facilities.

In another variant, for establishing a symmetrical optical design along the X-axis, the first and second outer sheets 110, 120 have zones 115, 125 arranged on the inner surfaces facing the middle sheet 130, as shown in FIG. 4, but zones 132 of the middle sheet 130 are arranged substantially in the middle between the inner surfaces of sheets 110, 120 along the X-axis, the zones 132 either arranged on an outer surface of middle sheet 130, the middle sheet configured to have one surface in the middle position, or by having zones 132 embedded inside the middle sheet 130, and the middle sheet being arranged equidistant in X-direction from the first and second outer sheets 110, 120.

Figure 9A:
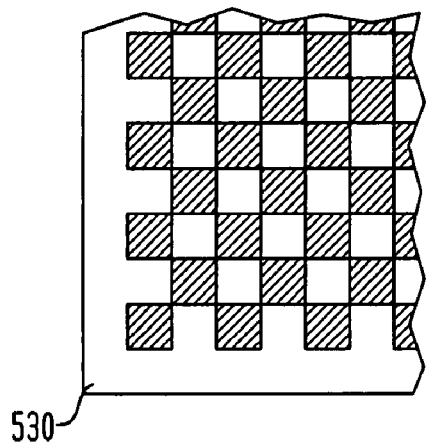
FIGS. 9a-b shows a partial plan view of an alternative embodiment of the sheets for the through-vision panel.
Figure 9B:
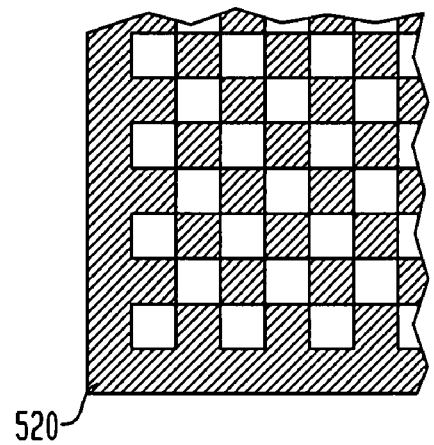
Figure 10A:
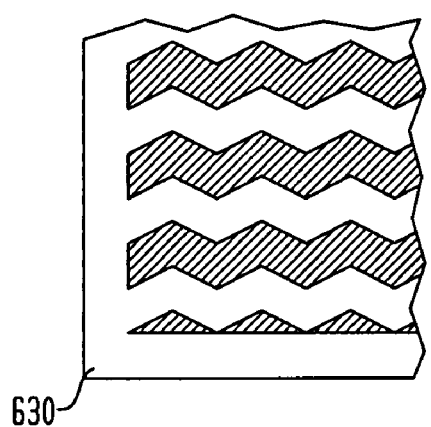
FIGS. 10a-b shows a partial plan view of another alternative embodiment of the sheets for the through-vision panel.
Figure 10B:
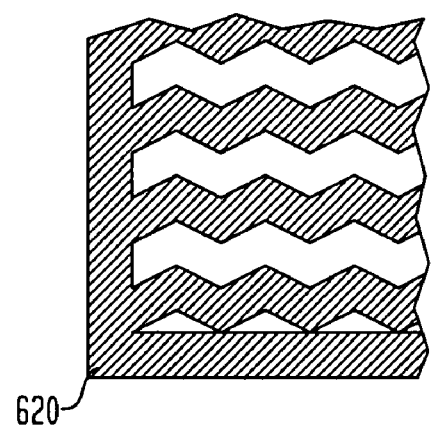

In the embodiment shown in FIGS. 2a and 2b, the zones 25, 32 are made of horizontal strips that traverse the second outer sheet 20 and the middle sheet 30 at least in the areas visible through frame 6. Other variants of patterns are also possible, as long as the pattern on the middle sheet 30 is complementary to the pattern on the first and second outer sheets 10, 20. Two examples of patterns on the middle sheets 530, 630 and second outer sheets 520, 620 are shown in FIGS. 9a-b and 10a-b. A chess board pattern is shown in FIGS. 9a-b, where the chess-board pattern of the second outer sheet 520 is surrounded by a frame that covers the outer periphery of sheet 520. Middle sheet 530 has a chess-pattern complementary to second outer sheet 520. A zigzag pattern is depicted in FIGS. 10a-b, with middle sheet 630 has a chess-pattern complementary to second outer sheet 620.

The different embodiments of the present invention describe various variant of different functional features, and the invention is not limited to the features shown. The various variants of the different functional features are not limited to the embodiments they are shown with, and are combinable or exchangeable among the various embodiments, as one of ordinary skill in the art would easily recognize.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multi-sheet through-vision panel comprising:
   a first outer sheet having a first inner surface;
   a second outer sheet having a second inner surface, said first and second outer sheets being superposed with one another;
   a middle sheet located between the first and second outer sheets, said middle sheet having a first outer surface facing the first inner surface of the first outer sheet and a second outer surface facing the second inner surface of the second outer sheet;
   a sliding mechanism configured to slide the middle sheet with respect to the first and second outer sheets between first and second positions; and a round frame having an u-shaped cross-section,
wherein the first and second outer sheets have a round shape and form a window together with the round frame being arranged around the outer boundaries of the first and second outer sheets,
wherein the middle sheet has a substantially round shape with first, second, and third linearly cut boundaries, the first and second linearly cut boundaries forming linear side edges in a direction to a sliding movement of the middle sheet, and the third linearly cut boundary being perpendicular to the first and second linearly cut boundaries and configured to form an area to accommodate the sliding mechanism in the window,
wherein at least one of the first and second inner surfaces has at least one light impairing zone, and the middle sheet has at least one light impairing zone on at least one of said first and second outer surfaces,
wherein said light impairing zones are superposed with one another when said middle sheet is in said first position and wherein said light impairing zones are in a staggered arrangement when said middle sheet is in said second position, and
wherein the sliding mechanism includes a bolt arranged perpendicularly to the first outer sheet traversing the first outer sheet, and a translation mechanism fastened to the bolt.

2. The multi-sheet through-vision panel of claim 1, wherein said panel blocks the passage of light therethrough when said middle sheet is in said second position.

3. The multi-sheet through-vision panel of claim 1, wherein said panel allows the passage of light therethrough when said middle sheet is in said first position.

4. The multi-sheet through-vision panel of claim 1, wherein the light impairing zones are arranged on both the first and second surfaces of the middle sheet and are substantially facing each other, and the light impairing zones are arranged on both the first and second inner surface of the first and second outer sheet and are substantially facing each other.

5. The multi-sheet through-vision panel of claim 1, wherein transparent zones are located between the light impairing zones of the first inner surface of the first outer sheet, and wherein a width of the light impairing zones of the first surface of the middle sheet in a direction of the movement of the middle sheet are at least the same width or larger than a width of the transparent areas.

6. The multi-sheet through-vision panel of claim 1, wherein transparent zones are located between the light impairing zones, and wherein a width of the light impairing zones of the second surface of the middle sheet in a direction of the movement of the middle sheet are at least the same width or larger than a width of the transparent areas.

7. The multi-sheet through-vision panel of claim 1, wherein at least some of the light impairing zones of the first and second outer sheets and the middle sheet are thinner in width in a direction of the movement of the middle sheet towards outer boundaries of the sheets.

8. The multi-sheet through-vision panel of claim 1, wherein
the bolt is configured to be turned with a key to slide the middle sheet; and
wherein the sliding mechanism further includes a sliding ring encircling a portion of the bolt that projects from the first outer sheet, the sliding ring configured to rotate freely around the bolt.

9. The multi-sheet through-vision panel of claim 1, wherein the round frame includes:
first and second rails having L-shaped cross-section, the L-shaped first and second rails being interposable with each other so as to form the frame with the u-shaped cross-section.

10. The multi-sheet through-vision panel of claim 1, wherein the middle sheet has a recess cut out from the sheet configured to accommodate the sliding mechanism.

11. The multi-sheet through-vision panel of claim 1, wherein the at least one light impairing zone on the first or second outer sheets has layers with a first light polarizing direction and the middle sheet has at least one light impairing zone with a second light polarizing direction.

12. The multi-sheet through-vision panel of claim 1, wherein the light impairing zone is an opaque zone.

13. The multi-sheet through-vision panel of claim 1, wherein the light impairing zone is a transparent or blurring zone.

14. The multi-sheet through-vision panel of claim 1, wherein the light impairing zone transitions from a first zone to a second zone.

15. The multi-sheet through-vision panel of claim 14, wherein said first-zone is a blurring zone and said second zone is an opaque zone.

16. The multi-sheet through-vision panel of claim 5, wherein a width of said light impairing zone on said middle sheet is greater than a width of the transparent zones on one of said first and second outer sheets, wherein said light altering elements on said middle sheet overlap at least one of said light altering elements on one of said first and second outer sheets, and wherein said light altering element on said middle sheet overlaps the at least one light altering element on the first or second sheet a length that is greater than the distance between the middle sheet and the at least one of the first and second sheets.

17. The multi-sheet through-vision panel of claim 16, wherein the distance between the middle sheet and the at least one of the first and second sheets is either the distance between the first outer surface of the middle sheet and the first inner surface of the first outer sheet or the distance between the second outer surface of the middle sheet and the second inner surface of the second outer sheet.

18. A multi-sheet through-vision panel comprising:
a plurality of sheets superposed relative to each other; and
a plurality of light altering elements provided on at least two of the sheets; and
a sliding mechanism for moving at least one of the plurality of sheets relative to another of the sheets,
wherein at least one of the sheets has the elements being movable relative to another of the sheets having the elements between a first position whereby the light altering elements are superposed relative to each other and a second position whereby the light altering elements are interdigitated relative to each other,
wherein the plurality of sheets include first and second outer sheets and an inner sheet located between the first and second outer sheets, and wherein the at least two of the sheets on which a plurality of light altering elements are provided include the inner sheet and one of the first and second outer sheets,
wherein the sliding mechanism includes a bolt arranged perpendicularly to the first outer sheet traversing the first outer sheet, and a translation mechanism fastened to the bolt,
wherein the panel further comprises a round frame having an u-shaped cross-section,
wherein the first and second outer sheets have a round shape and form a window together with the round frame being arranged around the outer boundaries of the first and second outer sheets, and wherein the inner sheet has a substantially round shape with first, second, and third linearly cut boundaries, the first and second linearly cut boundaries forming linear side edges in a direction to a sliding movement of the inner sheet, and the third linearly cut boundary being perpendicular to the first and second linearly cut boundaries and configured to form an area to accommodate the sliding mechanism in the window.

19. The multi-sheet through-vision panel of claim 18, further comprising a means for moving the inner sheet relative to the first and second outer sheets.

20. The multi-sheet through-vision panel of claim 18, wherein the light altering elements are comprised of a transparent material having a transparency that ranges from 0% to 100%.

21. The multi-sheet through-vision panel of claim 18, wherein light is diffused when passing through the light altering elements.

22. The multi-sheet through-vision panel of claim 18, wherein the light altering elements substantially prevent light from passing through a portion of the sheets containing the light altering elements.

23. The multi-sheet through-vision panel of claim 18, wherein the plurality of sheets are substantially round.

24. The multi-sheet through-vision panel of claim 18, wherein the plurality of sheets are substantially rectangular.

25. The multi-sheet through-vision panel of claim 18, wherein transparent elements are located between the light altering elements of the first or second outer sheet, and wherein a width of the light altering elements of the middle sheet in a direction of the movement of the middle sheet are at least the same width or larger than a width of the transparent areas.

26. The multi-sheet through-vision panel of claim 18, wherein at least some of the light altering elements of one of the first and second outer sheets and the middle sheet are thinner in width in a direction of the movement of the middle sheet towards outer boundaries of the sheets.

27. A multi-sheet through-vision panel comprising:
a plurality of sheets superposed relative to each other; and
a plurality of light altering elements provided on at least two of the sheets,
at least one of the sheets having the light altering elements being movable relative to another of the sheets having the light altering elements between a first position whereby the light altering elements are superposed relative to each other and a second position whereby the light altering elements are interdigitated relative to each other,
wherein transparent elements are located between the light altering elements and wherein a width of the light altering elements on at least one of the plurality of sheets is larger than a width of one or more of the light altering elements on a second of the plurality of sheets such that the light altering elements on at least one of the plurality of sheets overlaps at least portion of one of the light altering elements on the second of the plurality of sheets,
wherein the overlap between the light altering elements is a length that is greater than the distance between the at least one of the plurality of sheets and the second of the plurality of sheets.

* * * * *